United States Patent
Cook

(10) Patent No.: US 9,772,202 B1
(45) Date of Patent: Sep. 26, 2017

(54) ABSOLUTE POSITION ENCODER COMBINING SIGNALS OF TWO WIDELY SEPARATED WAVELENGTHS

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 15/200,808

(22) Filed: Jul. 1, 2016

(51) Int. Cl.
  *G01B 7/14* (2006.01)
  *G01B 7/30* (2006.01)
  *G01R 33/06* (2006.01)
  *G01D 5/20* (2006.01)

(52) U.S. Cl.
  CPC .................................... *G01D 5/20* (2013.01)

(58) Field of Classification Search
  CPC ....................................................... G01B 7/14
  USPC ...................................... 324/207.15, 207.24
  See application file for complete search history.

(56) References Cited

U.S. PATENT DOCUMENTS

| | | |
|---|---|---|
| 3,882,482 A | 5/1975 | Green et al. |
| 4,109,389 A | 8/1978 | Balcom et al. |
| 4,414,754 A | 11/1983 | Lapeyre |
| 4,964,727 A | 10/1990 | Huggins |
| 5,010,655 A | 4/1991 | Rieder et al. |
| 5,237,391 A | 8/1993 | Huggins |
| 5,279,044 A | 1/1994 | Bremer |
| 5,442,166 A | 8/1995 | Hollmann |
| 5,773,820 A | 6/1998 | Osajda et al. |
| 5,841,274 A | 11/1998 | Masreliez et al. |
| 5,886,519 A | 3/1999 | Masreliez et al. |
| 5,894,678 A | 4/1999 | Masreliez et al. |
| 5,965,879 A | 10/1999 | Leviton |
| 5,973,494 A | 10/1999 | Masreliez et al. |
| 6,002,250 A | 12/1999 | Masreliez et al. |
| 6,011,389 A | 1/2000 | Masreliez et al. |
| 6,400,138 B1 | 6/2002 | Andermo |
| 8,309,906 B2 | 11/2012 | Kapner et al. |

*Primary Examiner* — Bot Ledynh
(74) *Attorney, Agent, or Firm* — Seed IP Law Group LLP

(57) ABSTRACT

An electronic absolute position encoder includes a scale extending along a measuring axis direction (MA) and including a signal modulating scale pattern defining a corresponding absolute range R along MA, a detector including sensing elements arranged along MA and configured to provide detector signals which respond to the signal modulating scale pattern, and a signal processing configuration that determines an absolute position of the detector along the scale based on the detector signals. The signal modulating scale pattern includes a coarse periodic pattern component as a function of position along the scale having a spatial wavelength $\lambda_C$, wherein $n^*\lambda_C = R$ and n is an integer, and a fine periodic pattern component as a function of position along the scale having a spatial wavelength $\lambda_F$, wherein $(mn+1)^*\lambda_F = R$ and m is an integer that is at least two. The wavelengths $\lambda_C$ and $\lambda_C$ may be widely separated.

20 Claims, 6 Drawing Sheets

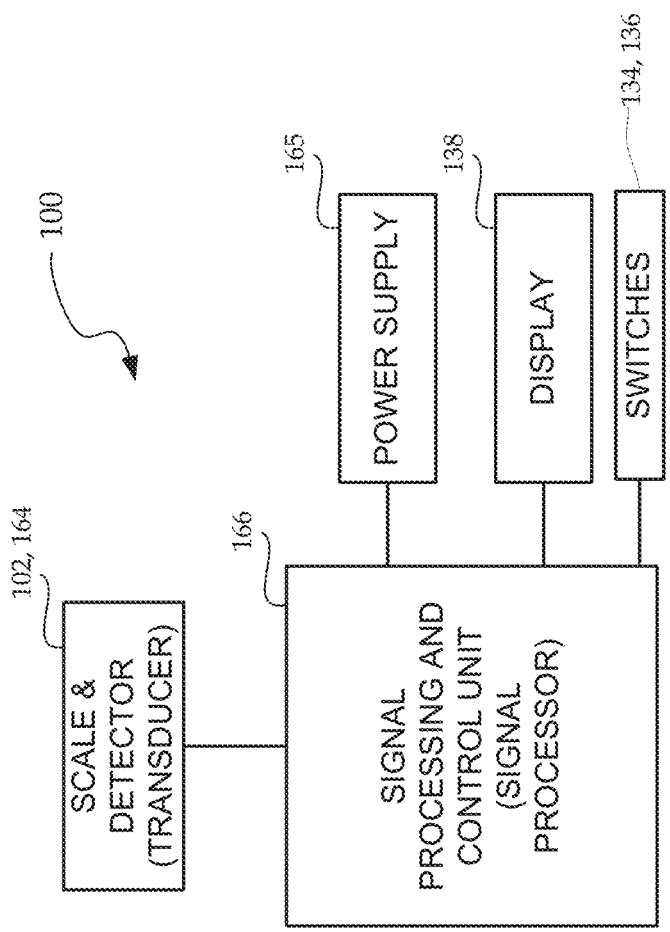

ABSOLUTE POSITION ENCODER COMBINING SIGNALS OF TWO WIDELY SEPARATED WAVELENGTHS

BACKGROUND

Technical Field

The invention relates generally to precision measurement instruments, and particularly to absolute position encoders.

Description of the Related Art

Various optical, capacitive, magnetic and inductive transducers, and movement or position transducers are available. These transducers use various geometric configurations of a transmitter and a receiver in a read head to measure movement between the read head and a scale. Inductive sensors are known to be one of the sensor types that is most immune to contamination by particles, oil, water, and other fluids. U.S. Pat. No. 6,011,389 (the '389 patent), which is hereby incorporated herein by reference in its entirety, describes an induced current position transducer usable in high accuracy applications. U.S. Pat. Nos. 5,973,494 and 6,002,250, which are each hereby incorporated herein by reference in their entireties, describe incremental position inductive calipers and linear scales, including signal generating and processing circuits. U.S. Pat. Nos. 5,886,519, 5,841,274, 5,894,678, 6,400,138, and 8,309,906, which are each hereby incorporated herein by reference in their entireties, describe absolute position inductive calipers and electronic tape measures using the induced current transducer. As described in these patents, the induced current transducer may be readily manufactured using known printed circuit board technology.

Different implementations of the induced current transducer (and other types of transducers) may be implemented as either incremental or absolute position encoders. In general, incremental position encoders utilize a scale that allows the displacement of a read head relative to a scale to be determined by accumulating incremental units of displacement, starting from an initial point along the scale. However, in certain applications such as those where encoders are used in low power consumption devices, it is more desirable to use absolute position encoders. Absolute position encoders provide a unique output signal, or combination of signals, at each position (of a read head) along a scale. They do not require continuous accumulation of incremental displacements in order to identify a position. Thus, absolute position encoders allow various power conservation schemes, amongst other advantages. In addition to the patents referenced above, U.S. Pat. Nos. 3,882,482, 5,965,879, 5,279,044, 5,237,391, 5,442,166, 4,964,727, 4,414,754, 4,109,389, 5,773,820 and 5,010,655, disclose various encoder configurations and/or signal processing techniques relevant to absolute encoders, and are each hereby incorporated herein by reference in their entirety.

The terms "track" or "scale track" as used herein generally refer to a region of the scale or scale pattern that extends along the measuring axis direction and has an approximately constant width and location along the direction transverse to the measuring axis. A scale track generally underlies and is aligned with a particular set of detectors that is guided along the measuring axis direction. The detectors respond to a pattern of scale element(s) in the underlying scale track to generate position signals that depends on the detector position along the track.

A common technique for encoding the absolute (ABS) position into an encoder is to use two encoder tracks of slightly different spatial wavelengths. For any two spatial wavelengths $\lambda_1$ and $\lambda_2$ that are very close, an ABS beat wavelength is defined as follows:

$$\lambda_{ABS} = \frac{\lambda_1 \lambda_2}{\lambda_1 - \lambda_2} \quad [1]$$

The ABS beat wavelength, which is a longer synthetic wavelength based on $\lambda_1$ and $\lambda_2$, can be used to determine a relatively coarse resolution synthetic wavelength position and approximately constitutes the ABS measuring range of the encoder. To achieve a long ABS measuring range, $\lambda_1$ and $\lambda_2$ are typically very similar values. For example, the two wavelengths used in one exemplary encoder are $\lambda_1$=5.4 mm and $\lambda_2$=5.268 mm, which provide an ABS range (ABS beat wavelength) of $\lambda_{ABS}$=216 mm.

A typical method for choosing the two wavelengths is to set an integer number n of coarse wavelengths $\lambda_1$ in the desired ABS range ($\approx \lambda_{ABS}$), then calculate the value of fine wavelength $\lambda_2$ as follows:

$$\lambda_{ABS} = n \lambda_1 \quad [2]$$

$$\lambda_2 = \lambda_1 \frac{n}{n+1} \quad [3]$$

In the exemplary encoder described above where $\lambda_1$=5.4 mm and $\lambda_2$=5.268 mm, $\lambda_1$ and $\lambda_2$ are calculated based on choosing n=40.

It is known to configure encoder tracks and corresponding detectors in order to generate signals that can be processed to determine the spatial phase (or position) of a detector within any given wavelength or period of either/both of the tracks that have the spatial wavelengths $\lambda_1$ and $\lambda_2$. Given such spatial phase information, and or position information, the absolute spatial phase and or absolute position within the synthetic ABS beat wavelength $\lambda_{ABS}$ may be determined according to known methods. Use of $\lambda_1$ and $\lambda_2$ that are very similar to each other, however, may lead to certain accuracy, resolution, and/or range limitations due cross-talk error and/or other difficulty in signal isolation, especially in compact low power encoders.

Users desire improvements to the known encoder systems outlined above in order to provide improved combinations of compact size, measuring range, resolution, low power, low cost and robustness to contamination. Configurations for absolute encoders that provide such improved combinations would be desirable.

BRIEF SUMMARY

This summary is provided to introduce a selection of concepts in a simplified form that are further described below in the Detailed Description. The summary is not intended to identify key features of the claimed subject matter, nor it intended to be used as an aid in determining the scope of the claimed subject matter.

An electronic absolute position encoder is provided that can be embodied, for example, in a high-precision electronic digital indicator, a caliper, a micrometer, a linear scale, etc. The encoder comprises a scale extending along a measuring axis direction, a detector, and a signal processing configuration that determines an absolute position of the detector along the scale based on detector signals provided by the detector. The scale includes a signal modulating scale pattern that defines a corresponding absolute range R along the measuring axis direction. Specifically, the scale includes a coarse periodic pattern component as a function of position along the scale having a spatial wavelength $\lambda_C$, wherein $n*\lambda_C=R$ and n is an integer, and a fine periodic pattern component as a function of position along the scale having a spatial wavelength $\lambda_F$, wherein $(mn+1)*\lambda_F=R$ and m is an integer that is at least two. The detector includes sensing elements arranged along the measuring axis direction, wherein the sensing elements are configured to provide detector signals which respond to the signal modulating scale pattern.

The signal processing configuration is configured to process the detector signals and determine a coarse wavelength spatial phase measurement Pc for a signal or signal component that includes signal effects due to the coarse periodic pattern component (having the coarse spatial wavelength $\lambda_C$) and does not include or suppresses significant signal effects due to the fine periodic pattern component (having the fine spatial wavelength $\lambda_F$).

The signal processing configuration is further configured to process the detector signals and determine a fine wavelength spatial phase measurement Pf for a signal or signal component that includes signal effects due to the fine periodic pattern component (having the fine spatial wavelength $\lambda_F$) and does not include or suppresses significant signal effects due to the coarse periodic pattern component (having the coarse spatial wavelength $\lambda_C$).

The signal processing configuration is configured to determine an absolute position of the sensing elements relative to the scale within the absolute range R based on the coarse wavelength spatial phase measurement Pc and the fine wavelength spatial phase measurement Pf.

Improved configurations of absolute encoders according to exemplary embodiments of the invention may have a technical advantage of achieving a longer encoder range R without having to use two spatial wavelengths $\lambda_C$ and $\lambda_F$ that are as close to each other as in the prior art.

BRIEF DESCRIPTION OF THE DRAWINGS

FIG. 7 is a block diagram of exemplary components of an electronic absolute position encoder according to an embodiment of the invention.

DETAILED DESCRIPTION

Figure 1:
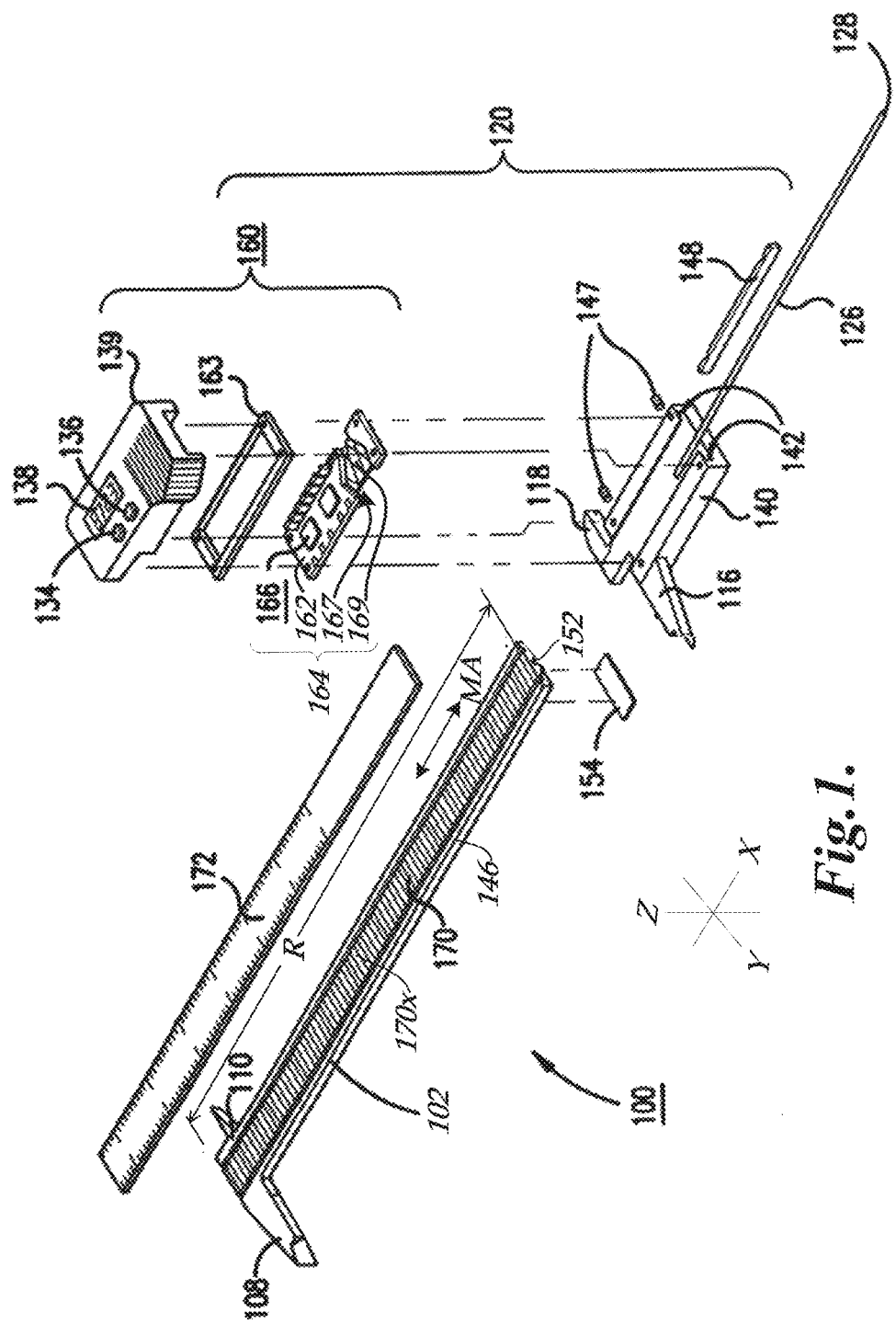
FIG. 1 is an exploded isometric view diagram of a hand tool caliper, which is one exemplary application for an encoder according to an embodiment of the present invention.

FIG. 1 is an exploded isometric view diagram of a hand tool type caliper 100 including a scale member 102 having a spar of roughly rectangular cross-section including a scale 170, and slider assembly 120. FIG. 1 illustrates X-Y-Z coordinate axes, for reference. The measuring axis direction is parallel to the X axis. The operation of such calipers is generally known, and the caliper 100 is only briefly described here, in order to indicate some exemplary practical requirements that create various problems and/or design constraints which are desirably solved by an encoder design such as that disclosed herein. As shown in FIG. 1, the scale 170 may include a signal modulating scale pattern 170x (represented schematically) extending along the measuring axis direction MA (the X axis). The variable suffix "x" is replaced by different letters herein to designate different corresponding signal modulating scale patterns. The signal modulating scale pattern 170x may be of an absolute type that defines a corresponding absolute range R along the measuring axis direction, as described in greater detail below. In many commercial calipers the signal modulating scale pattern 170x is be formed on a printed circuit board which is bonded in place. A known type of cover layer 172 (e.g., 100 μm thick) may cover the scale 170. Fixed jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include on/off switch 134 and zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to insure proper alignment for measuring, and for moving a read head portion 164 relative to the scale 170.

A pickoff assembly 160 mounted on the base 140 holds the read head portion 164 which in this embodiment includes substrate 162 (e.g., a printed circuit board) that carries a sensing portion or detector 167 (e.g., a field generating and sensing winding configuration) which comprises sensing elements 169, and a signal processing and control circuit 166. In the present description, the terms "sensing portion" and "detector" are often used interchangeably, unless otherwise indicated by description or context. A resilient seal 163 may be compressed between the cover 139 and the substrate 162 to exclude contamination from the circuitry and connections. The sensing portion 167 may be covered by an insulative coating. In one specific illustrative example the sensing portion 167 may be arranged parallel with and facing the scale 170 separated by a gap on the order of 0.5 mm along the depth (Z) direction. Together, the read head portion 164 and the scale 170 may form a transducer (e.g., an inductive or eddy current transducer which operates by generating changing magnetic fields), as will be described in more detail below.

It should be appreciated that for commercial acceptance of the caliper 100, the scale 170 (and therefore the signal modulating scale pattern 170x) should provide the longest practical measuring range along the X axis direction, and at the same time must have a relatively narrow width along the Y axis direction to provide convenient ergonomic use of the hand tool. The same may be said for the detector 167 and the sensing elements 169. Thus, the width available for scale tracks and the associated sensing elements 169 is limited, which limits signal generating area and/or scale track separation. As a result, in known encoder arrangements the overall accuracy or resolution have been limited by errors produced due to interference between various transducer signals or other limitations affecting the signal to noise (S/N) ratio of the transducer signals. The various principles disclosed herein provide certain advantages with regard to providing multiple cooperative signals, with improved signal discrimination and S/N ratio, under such size constraints.

Figure 2:
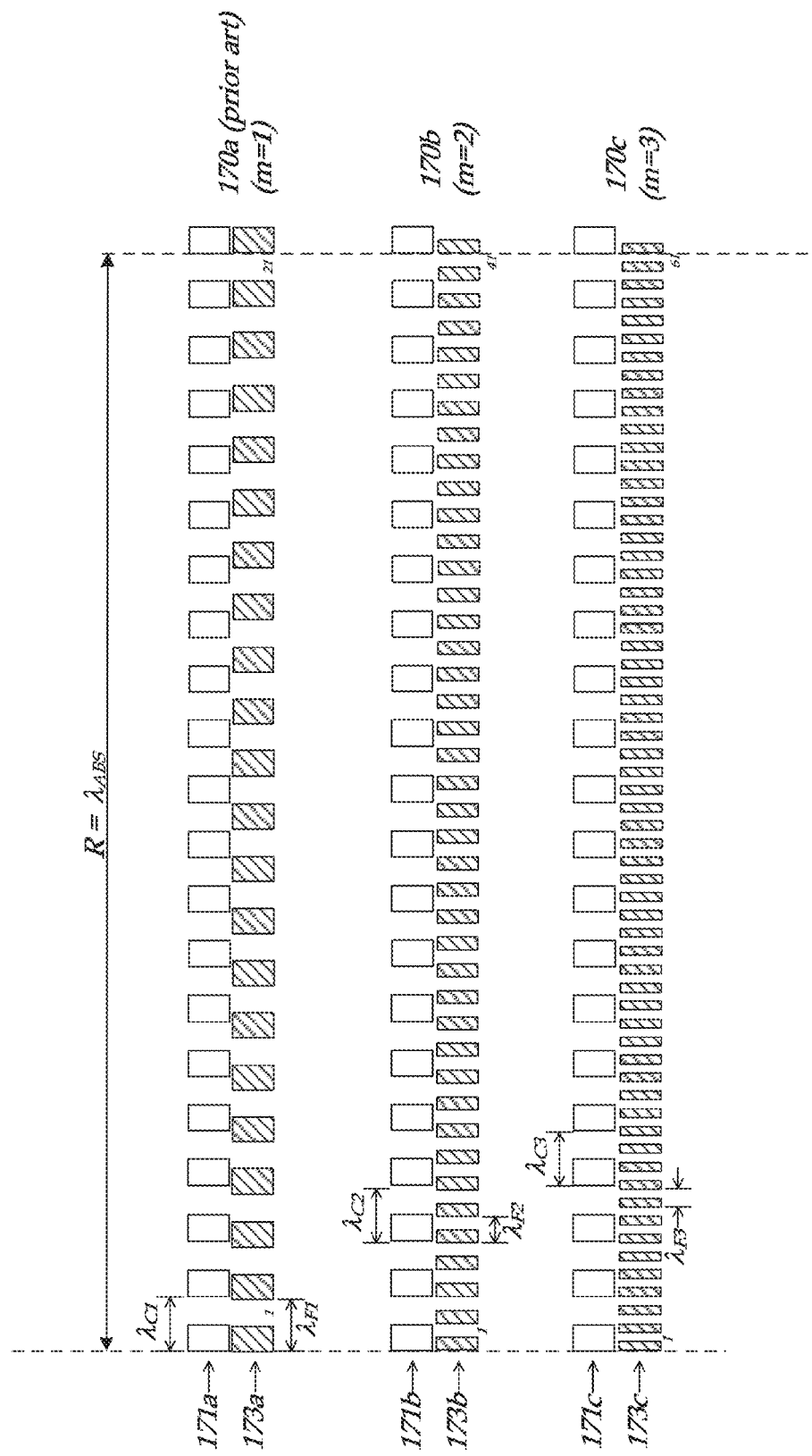
FIG. 2 is a plan view of 3 examples of a signal modulating scale pattern, each including a coarse periodic pattern component having a spatial wavelength $\lambda_C$ and a fine periodic pattern component having a spatial wavelength $\lambda_F$, including one previously known example and two examples according to principles disclosed herein.

FIG. 2 shows three (3) examples of a signal modulating scale pattern suitable for use on the scale 170, each of which extends along the measuring axis direction (MA). The three examples include one previously known example 170a, and two examples 170b and 170c according to principles disclosed herein. In all of the signal modulating scale patterns 170a, 170b and 170c of FIG. 2, n (the integer number of coarse spatial wavelengths included in the absolute measuring range R) is set as 20.

The signal modulating scale pattern 170a (prior art) includes a coarse periodic pattern component 171a as a function of position along the scale 170 having a spatial wavelength $\lambda_{C1}$, wherein $n*\lambda_{C1}=R$ and n is an integer (see equation [2] above.) The signal modulating scale pattern 170a also includes a fine periodic pattern component 173a as a function of position along the scale 170 having a spatial wavelength $\lambda_{F1}$, wherein $(n+1)*\lambda_F=R$ (see equation [3] above). As described above, in the prior art, in order to achieve a long absolute measuring range R ($\approx \lambda_{ABS}$), spatial wavelengths $\lambda_{C1}$ and $\lambda_{F1}$ are typically set very close to each other (see the denominator of equation [1] above). However, the inventor of the present disclosure has discovered that a more general formulation of the equations [1]-[3] may be advantageously used in many applications. In particular, equations [1]-[3] above are presented here as a special case of equations [4] and [5] below:

$$\lambda_{ABS} = \frac{\lambda_1 \lambda_2}{\lambda_1 - m\lambda_2} = n\lambda_1 \quad [4]$$

$$\lambda_2 = \lambda_1 \frac{n}{mn+1} \quad [5]$$

In particular, the prior art signal modulating scale pattern 170a of FIG. 2 includes coarse and fine periodic pattern components 171a and 173a having spatial wavelengths $\lambda_{C1}$ ($\approx \lambda_1$) and $\lambda_{F1}$ ($\approx \lambda_2$) that satisfy equations [4] and [5], wherein m=1. As indicated above, when m=1, the only way to achieve a long absolute measuring range R ($\approx \lambda_{ABS}$), with high measuring resolution is to set the spatial wavelengths $\lambda_{C1}$ and $\lambda_{F1}$ close to each other, that is they are very similar to one another. However, this may lead to limitations in the achievable "range to resolution" ratio (a useful figure of merit for absolute type scales or encoders) due to certain problems such as cross-talk error and/or difficulty in isolating the signals associated with each of the similar spatial wavelengths. For example, it will be appreciated that it is inherently difficult to use spatial filtering techniques or separate signals that have a very similar spatial wavelength or frequency. The signal modulating scale pattern 170a is one example of a prior art signal modulating scale pattern that exhibits such limitations.

However, the inventor has discovered that, by setting m as an integer that is at least two (e.g., m=2, m=3, etc.), coarse and fine spatial wavelengths $\lambda_C$ and $\lambda_F$ that are not so similar to each other may be used and still achieve a long absolute measuring range R, as may be observed according to equations [4] and [5] above.) This alleviates some of the aforementioned limitations and problems related to signal separation and other issues.

The signal modulating scale pattern 170b of FIG. 2 shows one embodiment according to principles disclosed herein, corresponding to m=2. In particular, it includes a coarse periodic pattern component 171b as a function of position along the scale 170 having a spatial wavelength $\lambda_{C2}$, wherein $n*\lambda_{C2}=R$ ($\approx \lambda_{ABS}$), and n is an integer (see equation [4] above). The signal modulating scale pattern 170b also includes a fine periodic pattern component 173b as a function of position along the scale 170 having a spatial wavelength $\lambda_{F2}$, wherein $(mn+1)*\lambda_{F2}=R$. (See equation [5] above.)

The signal modulating scale pattern 170c of FIG. 2 shows another embodiment according to principles disclosed herein, corresponding to m=3. In particular, it includes a coarse periodic pattern component 171c as a function of position along the scale 170 having a spatial wavelength $\lambda_{C3}$, wherein $n*\lambda_{C3}=R$ ($\approx \lambda_{ABS}$), and n is an integer (see equation [4] above). The signal modulating scale pattern 170c also includes a fine periodic pattern component 173c as a function of position along the scale 170 having a spatial wavelength $\lambda_{F3}$, wherein $(mn+1)*\lambda_{F3}=R$ and m=3. (See equation [5] above.)

In various exemplary embodiments according to the present disclosure, it may be practical if m is at most 10. In further exemplary embodiments, it may be most practical if m is at most 5.

In both of the signal modulating scale patterns 170b and 170c as illustrated, the coarse and fine spatial wavelengths $\lambda_C$ and $\lambda_F$ are not as similar to each other as required in the prior-art signal modulating scale pattern 170a, which may provide certain advantages in design of the detector portion and/or signal processing, which may result in an improved range to resolution ratio. They both achieve a long absolute measuring range R ($\approx \lambda_{ABS}$) by selecting a suitable integer m that allows the denominator of equation [4] to be sufficiently small, rather than using similar coarse and fine spatial wavelengths $\lambda_C$ and $\lambda_F$, as has been done in the prior art.

A signal modulating scale pattern 170x (e.g. 170 b or 170c, or the like) may be fabricated utilizing various techniques. For example, in inductive encoder embodiments, a substrate of the scale 170 may be a conducting bulk material (e.g., aluminum), and the signal modulating scale pattern 170x may be provided or formed thereon by machining, stamping, etching, or other suitable method. In another implementation, a substrate may be a non-conductive printed circuit board (PCB) with a conductive (e.g., copper)

layer deposited or laminated thereon. The signal modulating scale pattern 170*x* may be provided by machining or otherwise forming (e.g., photoresist patterning, etching, etc.) the conductive layer into the desired pattern of areas or area-enclosing loops, as is known in the art. In case of an optical encoder, the signal modulating scale pattern 170*x* may be formed, for example, in a chrome-on-glass configuration.

Figure 3:
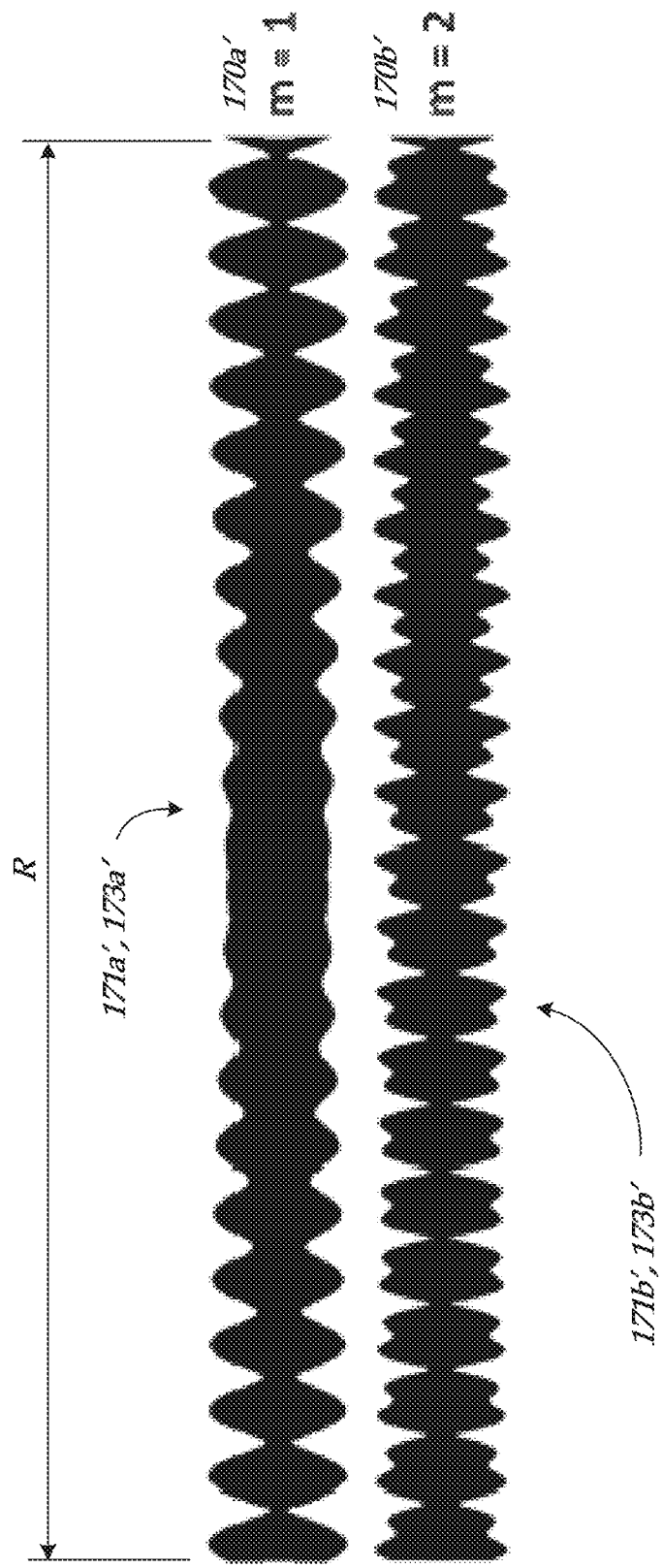
FIG. 3 is a plan view of 2 examples of a "superimposed" signal modulating scale pattern, each including a coarse periodic pattern component having a coarse spatial wavelength and a fine periodic pattern component having a fine spatial wavelength, including one example where the wavelengths are similar (where m=1) and one example according to principles disclosed herein (where m=2).

FIG. 3 is a plan view of 2 examples of "superimposed" signal modulating scale patterns 170*a'* and 170*b'*, each including a coarse periodic pattern component having a coarse spatial wavelength $\lambda_C$ ($\approx \lambda_1$) and a fine periodic pattern component having a fine spatial wavelength $\lambda_F$ ($\approx \lambda_2$) satisfying equation [5] above. "Superimposed" signal modulating scale patterns, as the term is used herein, is generally intended to mean an integrated or combined scale pattern, wherein the areas as a function of the x of two (coarse and fine) signal modulating scale pattern components is summed ("superimposed") to define the area as a function of x of the superimposed signal modulating scale pattern. In contrast to the signal modulating scale patterns shown in FIG. 2, which each comprise two separate scale tracks 171*x* and 173*x* comprising "square wave" periodic pattern components, in these examples the signal modulating scale patterns 170*a'* and 170*b'* each comprise a single scale track including superimposed sinusoidal periodic pattern components—171*a'* and 173*a'* in the pattern 170*a'*, and 171*b'* and 173*b'* in the pattern 170*b'*. In other words, a coarse periodic pattern component, and a fine periodic pattern component, each having a sinusoidal area as a function of position along the measuring axis direction, are superimposed in a single scale track for each of the signal modulating scale patterns 170*a'* and 170*b'*. A superimposed signal modulating scale pattern may allow a narrower scale width and/or more compact detector configuration and/or certain other advantages, in various applications. These signal modulating scale patterns are not only examples of superimposed coarse and fine periodic pattern components, they also qualitatively illustrate a previously outlined problem with an "m=1" absolute scales, in comparison to an advantage of an "m=2" absolute scale (see equations [4] and [5], above).

The range R is the same, and n=20, for each of the signal modulating scale patterns 170*a'* and 170*b'* illustrated in FIG. 3. The signal modulating scale pattern 170*a'* is an example where m=1. The coarse and fine wavelengths are similar, as in the signal modulating scale pattern 170*a* of FIG. 2. By observation, it will be appreciated that in the central section the similar wavelengths are nearly "out of phase", and the result is the signal modulating scale pattern 170*a'* shows very little spatial variation (e.g. its width is approximately constant along the central section). As a result, qualitatively speaking, a detector moved along the central section shows little variation in signal as a function of position, resulting in a relatively poorer S/N ratio along the central section and contributing little in the way of signal separation and/or discrimination between the signal components arising from the similar coarse and fine wavelengths.

The signal modulating scale pattern 170*b'* is an example where m=2. The coarse and fine wavelengths are dissimilar, as in the signal modulating scale pattern 170*b* of FIG. 2. By observation, it will be appreciated that, in contrast to the signal modulating scale pattern 170*a'*, there is no section of the signal modulating scale pattern 170*b'* that lacks a significant spatial variation as a function of changing position (e.g. its width shows a significant variation everywhere along the range R.) As a result, qualitatively speaking, a detector moved anywhere along the range R shows a good variation in signal as a function of position, resulting in a relatively good S/N ratio and contributing to good signal separation and/or good discrimination between the signal components arising from the dissimilar coarse and fine wavelengths.

Various principles related to the generation and detection of signals or signal components that are modulated by the signal modulating scale patterns disclosed herein are described here, and further below. In many practical devices, absolute position processing relies on signals corresponding to the incremental phase of each of the coarse and fine spatial periodic pattern components 171*x* and 173*x* included in a scale 170 (where x can be any alphanumeric, as shown in FIG. 2). In many practical devices, the detector 167 includes sensing elements 169 arranged along the measuring axis direction (see FIG. 1), wherein the sensing elements 169 are configured to provide detector signals in response to the signal modulating scale pattern 170*x* including the coarse and fine spatial periodic pattern components 171*x* and 173*x* (see FIG. 2). In inductive encoder embodiments, the sensing elements 169 comprise electromagnetic windings which are configured to provide detector signals that are responsive to a change in inductance (measured as impedance) sensed by the electromagnetic windings as a function of position along the signal modulating scale pattern 170*x*. The signal processing configuration 166 determines an absolute position of the detector 167 along the scale 170 based on the detector signals. In particular, the signal processing configuration 166 is configured to process the detector signals and determine a coarse wavelength spatial phase measurement Pc (or $\phi_1$) for a signal or signal component that includes signal effects due to the coarse periodic pattern component 171*x* and does not include or suppresses significant signal effects due to the fine periodic pattern component 173*x*. The signal processing configuration 166 is further configured to process the detector signals and determine a fine wavelength spatial phase measurement Pf (or $\phi_2$) for a signal or signal component that includes signal effects due to the fine periodic pattern component 173*x* and does not include or suppresses significant signal effects due to the coarse periodic pattern component 171*x*. In the present description, the terms "signal" and "signal component" may be used interchangeably, and "signal" may denote a signal that may not be isolated in normal operation, i.e., a signal that may be combined or mixed with other signals due to a temporary or permanent connection configuration, for example.

The signal processing configuration 166 is configured to determine an absolute position of the sensing elements 169 of the detector 167 relative to the scale 170*x* within the absolute range R based on the coarse wavelength spatial phase measurement Pc (or $\phi_1$) and the fine wavelength spatial phase measurement Pf (or $\phi_2$). For example, absolute linear and phase positions $X_{ABS}$ and $\phi_{ABS}$ may be calculated as follows:

$$x_{ABS} = \frac{\lambda_{ABS}}{2\pi} \phi_{ABS} \quad [6]$$

$$\phi_{ABS} = \phi_2 - m\phi_1 \quad [7]$$

where m is an integer that is at least two according to embodiments of the present invention.

It is known in the art to provide signals that are sinusoidal as a function of position (e.g. position x, along the measuring axis direction) by using a spatial filtering configuration for the sensing elements and/or the signal modulating scale pattern and/or using the effect of an operating gap between sensing elements and the signal modulating scale pattern. According to the principles outlined herein, for sinusoidal signals:

$$\sin\phi_2 = \sin\left(\frac{2\pi x}{\lambda_2}\right) = \sin\left(m\frac{2\pi x}{\lambda_1} + \frac{2\pi x}{n\lambda_1}\right) = \sin(m\phi_1 + \phi_{ABS}) \quad [8]$$

In some embodiments, sinusoidal quadrature signals may be generated by appropriate detector configurations, as outlined in greater detail below, and processed to provide values for φ1 and φ2, in order to determine an absolute position according to equations 6 and 7.

Figure 4:
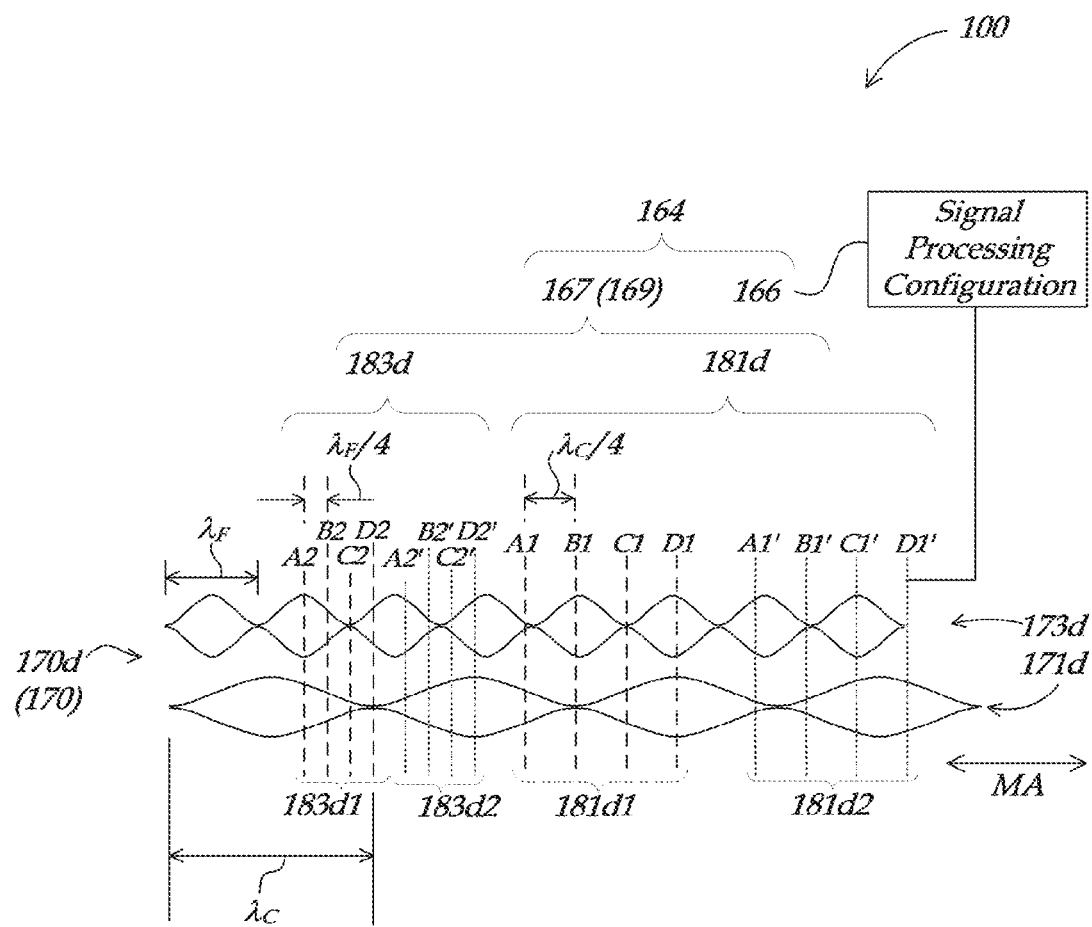
FIG. 4 is a plan view of a portion of a signal modulating scale pattern including a coarse periodic pattern component having a spatial wavelength $\lambda_C$ and a fine periodic pattern component having a spatial wavelength $\lambda_F$, relative to which a schematically represented detector includes respective sets of sensing elements configured and/or positioned to provide detector signals that suppress the coarse and fine periodic pattern components, respectively.

FIG. 4 is a plan view of a portion of a signal modulating scale pattern 170d including a coarse periodic pattern component 171d having a spatial wavelength $\lambda_C$ and a fine periodic pattern component 173d having a spatial wavelength $\lambda_F$, positioned relative to a schematically represented detector 167. The signal modulating scale pattern 170d may be considered analogous to the signal modulating scale pattern 170b of FIG. 2 (e.g. m=2, etc.), except the coarse and fine periodic pattern components comprise sinusoidal patterns instead of square wave patterns. The detector 167 includes respective sets of sensing elements 183d and 181d configured to interact with the signal modulating scale pattern 170d and provide detector signals that suppress the coarse and fine periodic pattern components, respectively.

The first set of coarse wavelength sensing elements 181d are arranged along the coarse periodic pattern component 171d to provide a set of signals that are processed to determine the coarse wavelength spatial phase measurement Pc. The second set of fine wavelength sensing elements 183d are arranged along the fine periodic pattern component 173 to provide a set of signals that are processed to determine the fine wavelength spatial phase measurement Pf.

In FIG. 4, each sensing element 169 is represented by a dashed line at its effective sensing location (e.g. at its center along the measuring axis direction) for simplicity. Various alternatives for the structure of the sensing elements 169 are known to one of ordinary skill in the art and/or included in the incorporated references. In any case, the detector signals from the sensing elements 169 are processed by the signal processing configuration 166 to determine an absolute position of the detector 167 and the read head 164 along the scale 170.

One suitable implementation of a configuration for the first set of sensing elements 181d, as illustrated, comprises a first filtering subset 181d1 of the coarse wavelength sensing elements (A1, B1, C1, D1) and a second filtering subset 181d2 of the coarse wavelength sensing elements (A1', B1', C1', D1'), all of which may span across both of the coarse and fine periodic pattern components 171d and 173d. The first and second filtering subsets 181d1 and 181d2 are arranged such that each sensing element of the first filtering subset 181d1 forms a complementary pair with a corresponding sensing element in the second filtering subset 181d2, wherein complementary pair members are spaced apart along the measuring axis direction MA by an integer K1 times 180 degrees of spatial phase difference in terms of the fine spatial wavelength $\lambda_F$, that is, by K1*(0.5*$\lambda_F$). In the particular example illustrated in FIG. 4, K1=5.

One suitable implementation of a configuration for the second set of sensing elements 183d, as illustrated, comprises a first filtering subset 183d1 of the fine wavelength sensing elements (A2, B2, C2, D2) and a second filtering subset 183d2 of the fine wavelength sensing elements (A2', B2', C2', D2'), all of which may span across both of the coarse and fine periodic pattern components 171d and 173d. The first and second filtering subsets 183d1 and 183d2 are arranged such that each sensing element of the first filtering subset 183d1 forms a complementary pair with a corresponding sensing element in the second filtering subset 183d2, wherein complementary pair members are spaced apart along the measuring axis direction MA by an integer K2 times 180 degrees of spatial phase difference in terms of the coarse spatial wavelength $\lambda_C$, that is, by K2*(0.5*$\lambda_C$). In the particular example illustrated in FIG. 4, K2=1.

A signal S provided by one of the sensing elements 169 (e.g. the sensing element A1 of the set of sensing elements 183d) as a function of a position x along the measuring axis direction MA may be modeled as a sum of fundamental signals, second harmonics, and a constant offset, as below:

$$S = L_1 \sin\left(\frac{2\pi x}{\lambda_1} + \theta_1\right) + L_2 \sin\left(\frac{2\pi x}{\lambda_2} + \theta_2\right) + \\ L_3 \sin\left(\frac{2\pi x}{0.5\lambda_1} + \theta_3\right) + L_4 \sin\left(\frac{2\pi x}{0.5\lambda_2} + \theta_3\right) + \beta \quad [9]$$

The $L_1$ and $L_2$ terms are respective fundamental signal components of the coarse spatial wavelength $\lambda_C$ ($\approx\lambda_1$) and the fine spatial wavelength $\lambda_F$ ($\approx\lambda_2$) and having respective phase offsets $\phi_1$ and $\phi_2$. The $L_3$ and $L_4$ terms are respective second harmonic signal components of the coarse spatial wavelength $\lambda_1$ and the fine spatial wavelength $\lambda_2$ having respective phase offsets $\phi_3$ and $\phi_4$. The β term is a constant offset.

The signal processing configuration 166 may be configured to process the first set of detector signals of the coarse wavelength sensing elements 181d to provide coarse wavelength spatial phase measurement signals wherein signal components due to the fine periodic pattern component 173d (e.g., the $L_2$ and $L_4$ terms of equation [9]) are suppressed (see description of equations [10]-[13], below). As a result, the signal processing configuration 166 may relatively accurately determine the coarse wavelength spatial phase measurement Pc for the coarse wavelength sensing elements 181d relative to the spatial wavelength $\lambda_C$ ($\approx\lambda_1$). Similarly, the signal processing configuration 166 may be configured to process the second set of detector signals of the fine wavelength sensing elements 183d to provide fine wavelength spatial phase measurement signals wherein signal components due to the coarse periodic pattern component 171d (e.g., the $L_1$ and $L_3$ terms of equation [9]) are suppressed (see description of equations [15]-[18], below). As a result, the signal processing configuration 166 may relatively accurately determine the fine wavelength spatial phase measurement Pf for the fine wavelength sensing elements 183d relative to the spatial wavelength $\lambda_F$ ($\approx\lambda_2$).

In the embodiment of FIG. 4, the sensing elements within each of the first and second filtering subsets 181d1 and 181d2 of the coarse wavelength sensing elements 181d are configured to sample phase signals at relative phase positions separated by 90 degrees of spatial phase shift (e.g. 0, 90, 180 and 270 degrees) with respect to the coarse spatial wavelength $\lambda_C$ (=$\lambda_1$). Similarly, the sensing elements within each of the first and second filtering subsets 183d1 and 183d2 of the fine wavelength sensing elements 183d are configured to sample phase signals at relative phase positions separated by 90 degrees of spatial phase shift (e.g. 0, 90, 180 and 270 degrees) with respect to the fine spatial wavelength $\lambda_F$ (=$\lambda_2$).

In order to provide a signal that corresponds to the coarse wavelength spatial phase measurement Pc ($=\phi_1$), the signals for each complementary pair of the coarse wavelength sensing elements 181d may be combined either electronically or mathematically in the signal processing configuration 166. This provides quadrature signals $\overline{A1}$, $\overline{B1}$, $\overline{C1}$ and $\overline{D1}$ given by the expressions:

$$\overline{A1}=A1\pm A1' \quad [10]$$

$$\overline{B1}=B1\pm B1' \quad [11]$$

$$\overline{C1}=C1\pm C1' \quad [12]$$

$$\overline{D1}=D1\pm D1' \quad [13]$$

For even values of K1, the differences may be used and for odd values of K1 the sums may be used in equations [10]-[13]. The quadrature signals $\overline{A1}$, $\overline{B1}$, $\overline{C1}$ and $\overline{D1}$ may then be used to determine the coarse wavelength spatial phase measurement Pc ($=\phi_1$) by the expression:

$$\phi_1 = \tan^{-1}\frac{\overline{A1}-\overline{C1}}{\overline{B1}-\overline{D1}} \quad [14]$$

It will be appreciated that by spacing the complementary pairs apart by an integer number times 180 degrees of spatial phase difference in terms of the fine spatial wavelength $\lambda_F$ ($\approx\lambda_2$), the quadrature signals $\overline{A1}$, $\overline{B1}$, $\overline{C1}$ and $\overline{D1}$ outlined above eliminate common mode signal components arising from the fine periodic pattern component 173d.

As may be understood by analogy with the previous description, in order to provide a signal that corresponds to the fine wavelength spatial phase measurement Pf ($=\phi_2$), the signals for each complementary pair of the fine wavelength sensing elements 183d may be combined either electronically or mathematically in the signal processing configuration 166. This provides quadrature signals $\overline{A2}$, $\overline{B2}$, $\overline{C2}$ and $\overline{D2}$ given by the expressions:

$$\overline{A2}=A2\pm A2' \quad [15]$$

$$\overline{B2}=B2\pm B2' \quad [16]$$

$$\overline{C2}=C2\pm C2' \quad [17]$$

$$\overline{D2}=D2\pm D2' \quad [18]$$

For even values of K2, the differences may be used and for odd values of K2 the sums may be used in equations [15]-[18]. The quadrature signals $\overline{A2}$, $\overline{B2}$, $\overline{C2}$ and $\overline{D2}$ may then be used to determine the fine wavelength phase Pf ($\phi_2$) by the expression:

$$\phi_2 = \tan^{-1}\frac{\overline{A2}-\overline{C2}}{\overline{B2}-\overline{D2}} \quad [19]$$

It will be appreciated that by spacing the complementary pairs apart by an integer number times 180 degrees of spatial phase difference in terms of the fine spatial wavelength $\lambda_C$ ($\approx\lambda_1$), the quadrature signals $\overline{A2}$, $\overline{B2}$, $\overline{C2}$ and $\overline{D2}$ outlined above eliminate common mode signal components arising from the coarse periodic pattern component 171d.

It should be appreciated that the principles outlined above may be applied to a variety of other embodiments. For example, it should be appreciated that although the coarse and fine periodic pattern components 171d and 173d have been illustrated as separate pattern components in FIG. 4, principles are disclosed above wherein the sensing elements may span both the coarse and fine periodic pattern components 171d and 173d, yet the signal components that arise from each may be discriminated from (or suppressed from) one another as outlined above. Therefore, in another embodiment, the area modulations included in the coarse and fine periodic pattern components 171d and 173d may be summed into a single "superimposed" pattern (e.g. similar to the superimposed signal modulating scale pattern 170b' shown in FIG. 3) in a scale track aligned with the detector 167

The configuration of the detector 167 may also be generalized. More generally, a set of coarse wavelength sensing elements 181x may be configured to provide detector signals corresponding to Q spatial phases spaced apart at 360/Q degrees of spatial phase difference in terms of the coarse spatial wavelength $\lambda_C$ ($=\lambda_1$), and a set of fine wavelength sensing elements 183a may be configured to provide detector signals corresponding to Q spatial phases spaced apart at 360/Q degrees of spatial phase difference in terms of the fine spatial wavelength $\lambda_F$ ($\approx\lambda_2$). For example, in FIG. 4 described above, Q=4 and four spatial phases spaced apart by 90 degrees (0, 90, 180 and 270 degrees) are sampled by each of the subsets included in the coarse wavelength sensing elements 181d and the fine wavelength sensing elements 183d. In contrast, in one exemplary alternative embodiment employing a three phase detector, the coarse wavelength sensing elements 181d may comprise the first and second subsets 181d1 (A1, B1, C1) and 181d2 (A1', B1', C1'), each comprising sensing elements spaced $\lambda_C/3$ apart. Similarly, the fine wavelength sensing elements 183d may comprise the first and second subsets 183d1 (A2, B2, C2) and 183d2 (A2', B2', C2'), each comprising sensing elements spaced $\lambda_F/3$ apart. The various subsets are located such that complementary pairs of sensing elements are spaced apart according to previously outlined principles. By analogy with previous description, it will be understood that the resulting phase signals $A_1$, $B_1$, $C_1$, $A_1'$, $B_1'$ and $C_1'$ may be combined to provide three combined phase signals $\alpha_1$, $\beta_1$ and $\gamma_1$ according to the relations:

$$\alpha_1 = A_1 - A_1' \quad [20]$$

$$\beta_1 = B_1 - B_1' \quad [21]$$

$$\gamma_1 = C_1 - C_1' \quad [22]$$

The three combined phase signals may be used to provide three signals $S_{\alpha\beta 1}$, $S_{\beta\gamma 1}$ and $S_{\gamma\alpha 1}$ according to the relations:

$$S_{\alpha\beta 1} = \alpha_1 - \beta_1 \quad [23]$$

$$S_{\beta\gamma 1} = \beta_1 - \gamma_1 \quad [24]$$

$$S_{\gamma\alpha 1} = \gamma_1 - \alpha_1 \quad [25]$$

The coarse wavelength spatial phase measurement Pc ($=\phi_1$) may be determined according to methods disclosed in U.S. Pat. No. 6,005,387, which is hereby incorporated by reference herein in its entirety, according to the relation:

$$\phi_1 = \tan^{-1}\frac{1}{\sqrt{3}}\left(\frac{S_{\beta\gamma 1} - S_{\gamma\alpha 1}}{S_{\alpha\beta 1}}\right) \quad [26]$$

Similarly, the phase signals $A_2$, $B_2$, $C_2$, $A_2'$, $B_2'$ and $C_2'$ may be combined to provide three combined phase signals $\alpha_2$, $\beta_2$ and $\gamma_2$ according to the relations:

$$\alpha_2 = A_2 - A_2' \quad [27]$$

$$\beta_2 = B_2 - B_2' \quad [28]$$

$$\gamma_2 = C_2 - C_2' \quad [29]$$

The three combined phase signals may be used to provide three signals $S_{\alpha\beta2}$, $S_{\beta\gamma2}$ and $S_{\gamma\alpha2}$ according to the relations:

$$S_{\alpha\beta2} = \alpha_2 - \beta_2 \quad [30]$$

$$S_{\beta\gamma2} = \beta_2 - \gamma_2 \quad [31]$$

$$S_{\gamma\alpha2} = \gamma_2 - \alpha_2 \quad [32]$$

The fine wavelength spatial phase measurement Pf ($=\phi_2$) may be determined according to the relation:

$$\phi_2 = \tan^{-1} \frac{1}{\sqrt{3}} \left( \frac{S_{\beta\gamma2} - S_{\gamma\alpha2}}{S_{\alpha\beta2}} \right) \quad [33]$$

As previously indicated, various alternatives for the structure of the sensing elements 169 are known to one of ordinary skill in the art and/or included in the incorporated references. To briefly indicate a few of the exemplary alternatives, in some inductive encoder embodiments the sensing elements 169 of the detector 167 may be formed of conductive material, such as metallic (e.g., copper) plates, wires and loops. In these embodiments, the detector 167 and the signal modulating scale pattern 170x may form an eddy current transducer which operates in one implementation by generating changing magnetic fields. The changing magnetic fields may be generated by providing a changing current in the sensing elements 169 of the detector 167, which induces circulating currents known as eddy currents in a portion of the signal modulating scale pattern 170x that is within the changing magnetic field range. The effective inductances of the sensing elements 169 of the detector 167 are influenced by the respective eddy currents, to correspondingly provide signals having a signal characteristic that varies depending on the sensing elements position along the of the signal modulating scale pattern 170x as outlined above. In various embodiments, the sensing elements 169 may comprise single turn or multi-turn planar windings formed to enclose an area having a desired shape for interacting with the underlying portions of the signal modulating scale pattern 170x. Alternatively, an absolute position encoder configured according to the principles disclosed herein may utilize a transformer type of architecture similar to that disclosed in the '389 patent, which comprises transmitter (TX) and receiver (RX) coils wherein the receiver (RX) coils generally correspond to the sensing elements 169 of the detector 167.

Figure 5:
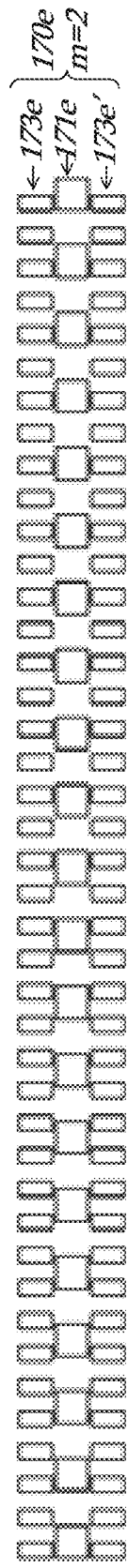
FIG. 5 is a plan view of a further example of a signal modulating scale pattern including a coarse periodic pattern component having a spatial wavelength $\lambda_C$ and a fine periodic pattern component having a spatial wavelength $\lambda_F$, according to principles disclosed herein.

FIG. 5 is a plan view of a further example of a signal modulating scale pattern 170e including a coarse periodic pattern component 171e having a spatial wavelength $\lambda_C$ and a fine periodic pattern component 173e and 173e' having a spatial wavelength $\lambda_F$, according to principles disclosed herein. The coarse and fine spatial wavelengths $\lambda_C$ ($=\lambda_1$) and $\lambda_F$ ($\approx\lambda_2$) satisfying equation [5] above, wherein m=2 and n=20, and may be understood as a variation of the signal modulating scale pattern 170b of FIG. 2, wherein the fine periodic pattern component comprises two portions 173e and 173e' which are identical and extend along both sides of the coarse periodic pattern component 171e along the measuring axis direction. Such a configuration may be advantageous in preserving symmetries in case of read head misalignments. In contrast to the signal modulating scale pattern 170b of FIG. 2, which may be configured with two separate detector portions having sensing elements configured to sensing the coarse and fine wavelengths along separate scale tracks, in this example the coarse and fine periodic pattern components (171e and 173e/173e', respectively) are advantageously sensed by a detector having sensing elements configured to sense the coarse and fine wavelengths along a single scale track. On embodiment of such a configuration is described below.

Figure 6:
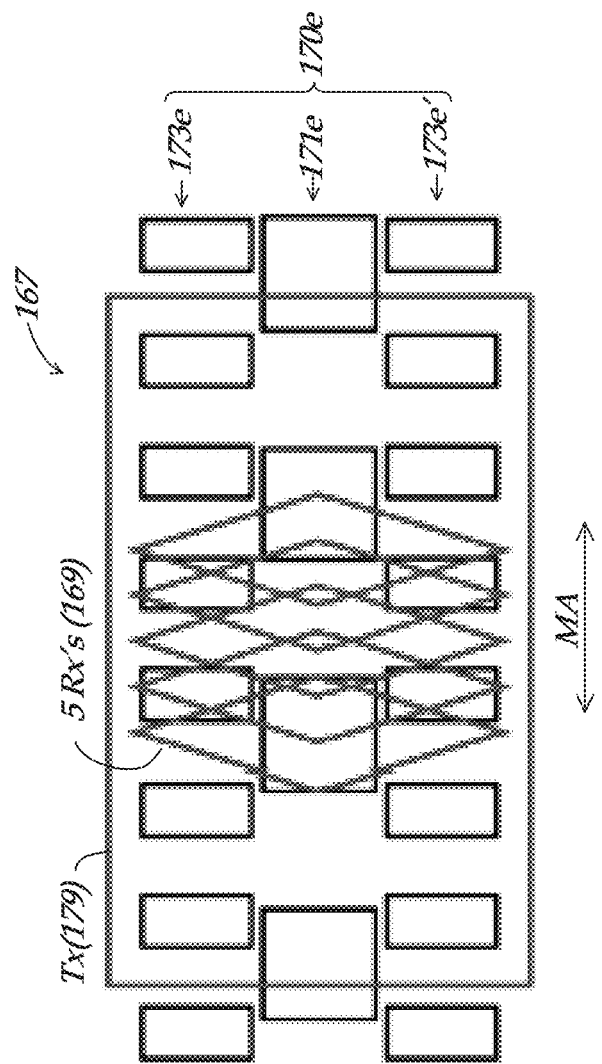
FIG. 6 is a plan view of a portion of the signal modulating scale pattern of FIG. 5, relative to which a detector including five (5) sensing elements is positioned to provide detector signals, in accordance with principles disclosed herein.

FIG. 6 is a plan view of a portion of the signal modulating scale pattern 170e of FIG. 5, relative to which a detector 167 including five (5) sensing elements 169 are positioned in a single-track configuration to provide detector signals, in accordance with principles disclosed herein. In the illustrated embodiment, the schematically illustrated sensing elements 169 each comprise an approximately planar loop winding of a generally diamond shape and are provided on a suitable substrate. Each sensing element 169 is relatively shorter along the measuring axis direction MA and relatively longer along a direction transverse to the measuring axis direction MA, and each sensing element 169 spans across the coarse and fine periodic pattern components 171e, 173e, 173e' along the direction transverse to the measuring axis direction MA. In the illustrated embodiment, the detector 167 optionally includes a transmitter coil 179 in addition to the sensing elements 169, which are used as receiver coils to form a transformer-type inductive detector, though the transmitter coil 179 may be omitted in other detector configurations, as will be apparent to those skilled in the art. In the transformer-type inductive encoder as illustrated, AC current in the transmitter coil 179 creates a magnetic field that is picked up by the five sensor elements 169 (receiver coils). The composite signal modulating scale pattern 170e inductively influences magnetic field to encode therein both $\lambda_C$ ($=\lambda_1$) and $\lambda_F$ ($\approx\lambda_2$) phase position information.

The novel configuration of the signal modulating scale pattern 170e, wherein the coarse and fine spatial wavelengths $\lambda_C$ and $\lambda_F$ may be widely separated using a configuration where m=2, 3, 4, etc., as previously outlined, in turn allows for use of a single-track detector with relatively few sensing elements, to simultaneously sense the spatial phases of both the coarse and fine spatial wavelengths $\lambda_C$ and $\lambda_F$. In various embodiments, it may be advantageous to use a set of 2m+1 sensing elements to sense a corresponding signal modulating scale pattern. One specific embodiment, with m=2, is described here with reference to FIG. 6, wherein $\lambda_2$ is very nearly the 2nd harmonic of $\lambda_1$, and two scale tracks for $\lambda_2$ and $\lambda_1$ can be sensed with a single set of sensing elements. In one embodiment, the spatial phase signals for $\lambda_2$ and $\lambda_1$ can be separated by calculating the Fourier sine and cosine components for the 1st harmonic (m=1) to provide $\phi_1$ (=Pc), and for the 2nd harmonic (m=2) to provide $\phi_2$ (=Pf). A set of five (5) sensing elements is found sufficient to measure $\phi_1$ and $\phi_2$ using the Fourier calculation method, which is 1 fewer sensing element than required in the prior art. Reduction in the number of sensing elements used in the detector 167 is technically advantageous to achieve reduced power consumption as well as reduced complexity in detector configuration and detector signal processing.

The spacing of the five (5) sensor elements 169 in FIG. 6 can be $\lambda_1/5$ or $2\lambda_1/5$, in accordance with various embodiments of the present invention. More generally, the sensing elements 169 include at least 5 sensing elements that provide a set of at least 5 signals, wherein the at least 5 sensing elements are arranged at a spacing along the measuring axis direction (e.g., at $\lambda_1/5$ or $2\lambda_1/5$). Processing the set of at least 5 signals according to a first relationship provides a signal component that includes signal effects due to the coarse periodic pattern component and suppresses significant signal effects due to the fine periodic pattern component. Processing the set of at least 5 signals according to a second relationship provides a signal component that includes signal effects due to the fine periodic pattern component and suppresses significant signal effects due to the coarse periodic pattern component.

In one embodiment, the processing includes use of the discrete Fourier transform (DFT) method. The cosine and sine quadrature components, a and b, are calculated as:

$$a_m = \frac{2}{Q}\sum_{i=1}^{Q} s_i \cos\left(2\pi i \frac{m}{Q}\right) \qquad [34]$$

$$b_m = \frac{2}{Q}\sum_{i=1}^{Q} s_i \sin\left(2\pi i \frac{m}{Q}\right) \qquad [35]$$

where Q is the total number of the sensing elements, si is the measurement value from the i-th sensing element, and m is the integer harmonic number. This formula assumes the sensing elements are equally spaced over one wavelength. The phase can then be found simply as:

$$\phi_m = \tan^{-1}\left(\frac{b_m}{a_m}\right) \qquad [36]$$

When Q ≥5, the encoder can calculate $\phi_m$ for m=1 and m=2 from the same sensor signals. Specifically, the coarse wavelength spatial phase measurement $\phi_1$ (=Pc) can be determined from equation [36] where m=1, and the fine wavelength spatial phase measurement $\phi_2$ (=Pf) also from equation [36] where m=2.

Because $\lambda_F$ ($\approx\lambda_2$) is not exactly at the $2^{nd}$ harmonic of $\lambda_C$ (=$\lambda_1$), both the $\phi_1$ (=Pc) and $\phi_2$ (=Pf) signals may have crosstalk error contributions arising from the other signal. In some embodiments, use of a detector configuration including complementary pairs of sensing elements, as described above in reference to FIG. 4, may be advantageous in removing the crosstalk error contributions.

FIG. 7 is a block diagram of exemplary components of an electronic absolute position encoder according to an embodiment of the invention. The elements similarly disclosed in FIG. 1 that illustrates the caliper 100 incorporating the electronic absolute position encoder are identified with the same reference numbers as used in FIG. 1. The electronic absolute position encoder 100 includes the scale 170 and the detector 167, which together form a transducer. The electronic absolute position encoder 100 includes suitable user interface features such as the display 138 and the user-operable switches 134, 136, and may additionally include a power supply 165. All of these elements are coupled to a signal processing configuration 166, which may be embodied as the signal processing and display electronic circuit in IC chip(s). The signal processing configuration 166 receives detector signals from the detector 167 and processes the detector signals to determine an absolute position of the detector 167 along the scale 170. It will be appreciated that the signal processing configuration 166 may comprise any combination of signal processing and physical circuitry.

Various embodiments described above can be combined to provide further embodiments. All of the U.S. patents referred to in this specification are incorporated herein by reference, in their entirety. Aspects of the embodiments can be modified, if necessary to employ concepts of the various patents, to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled.

The invention claimed is:

1. An electronic absolute position encoder, comprising:
a scale extending along a measuring axis direction and including a signal modulating scale pattern defining a corresponding absolute range R along the measuring axis direction, the signal modulating scale pattern comprising a coarse periodic pattern component as a function of position along the scale having a spatial wavelength $\lambda_C$, wherein n*$\lambda_C$=R and n is an integer, and a fine periodic pattern component as a function of position along the scale having a spatial wavelength $\lambda_F$, wherein (mn+1)*$\lambda_F$=R and m is an integer that is at least two;
a detector including sensing elements arranged along the measuring axis direction, the sensing elements configured to provide detector signals which respond to the signal modulating scale pattern; and
a signal processing configuration that determines an absolute position of the detector along the scale based on the detector signals provided by the detector,
wherein:
the signal processing configuration is configured to process the detector signals and determine a coarse wavelength spatial phase measurement Pc for a signal or signal component that includes signal effects due to the coarse periodic pattern component and does not include or suppresses significant signal effects due to the fine periodic pattern component;
the signal processing configuration is further configured to process the detector signals and determine a fine wavelength spatial phase measurement Pf for a signal or signal component that includes signal effects due to the fine periodic pattern component and does not include or suppresses significant signal effects due to the coarse periodic pattern component; and
the signal processing configuration is configured to determine an absolute position of the sensing elements relative to the scale within the absolute range R based on the coarse wavelength spatial phase measurement Pc and the fine wavelength spatial phase measurement Pf.

2. The electronic absolute position encoder of claim 1, wherein the signal processing configuration is configured to determine an absolute position of the sensing elements relative to the scale within the absolute range R based on a difference Pf−(m*Pc).

3. The electronic absolute position encoder of claim 1, wherein m is at most 10.

4. The electronic absolute position encoder of claim 3, wherein m is at most 5.

5. The electronic absolute position encoder of claim 1, wherein:
the signal modulating scale pattern comprises a first scale track including the coarse periodic pattern component and not the fine periodic pattern component, and a second scale track including the fine periodic pattern component and not the coarse periodic pattern component; and the detector includes a first set of sensing elements arranged along the first scale track to provide a set of signals that are processed to determine the coarse wavelength spatial phase measurement Pc, the detector includes a second set of sensing elements arranged along the second scale track to provide a set of signals that are processed to determine the fine wavelength spatial phase measurement Pf.

6. The electronic absolute position encoder of claim 1, wherein:

the signal modulating scale pattern comprises a scale track including the coarse periodic pattern component and the fine periodic pattern component combined along the scale track; and the sensing elements include at least 5 sensing elements that provide a set of at least 5 signals, wherein the at least 5 sensing elements are arranged at a spacing along the measuring axis direction such that processing the set of at least 5 signals according to a first relationship provides a signal component that includes signal effects due to the coarse periodic pattern component and suppresses significant signal effects due to the fine periodic pattern component, and processing the set of at least 5 signals according to a second relationship provides a signal component that includes signal effects due to the fine periodic pattern component and suppresses significant signal effects due to the coarse periodic pattern component.

7. The electronic absolute position encoder of claim 6, wherein the coarse periodic pattern component and the fine periodic pattern component are superimposed.

8. The electronic absolute position encoder of claim 6, wherein the coarse periodic pattern component and the fine periodic pattern component are placed adjacent to each other.

9. The electronic absolute position encoder of claim 6, wherein the sensing elements of the detector are linearly arrayed to form a single-track detector.

10. The electronic absolute position encoder of claim 6, wherein the signal processing configuration is configured to determine the coarse wavelength spatial phase measurement Pc by calculating the Fourier sign and cosine components for the 1st harmonic (m=1) of the coarse spatial wavelength $\lambda_C$, and to determine the fine wavelength spatial phase measurement Pf by calculating the Fourier sign and cosine components for the 2nd harmonic (m=2) of the coarse spatial wavelength $\lambda c$.

11. The electronic absolute position encoder of claim 6, wherein the sensing elements consist of 5 sensing elements.

12. The electronic absolute position encoder of claim 6, wherein:

the sensing elements include a set of coarse wavelength sensing elements configured to provide a first set of detector signals, and a set of fine wavelength sensing elements configured to provide a second set of detector signals;

the set of coarse wavelength sensing elements includes:
a first filtering subset of the set of coarse wavelength sensing elements that each span across the coarse and fine periodic pattern components; and
a second filtering subset of the set of coarse wavelength sensing elements that each span across the coarse and fine periodic pattern components;
wherein the first and second filtering subsets of the set of coarse wavelength sensing elements are arranged such that each sensing element of the first filtering subset forms a complementary pair with a sensing element in the second filtering subset that is spaced apart from it along the measuring axis direction by an integer number K1 times 180 degrees of spatial phase difference in terms of the spatial wavelength $\lambda_F$; and the set of fine wavelength sensing elements includes:
a first filtering subset of the set of fine wavelength sensing elements that each span across the coarse and fine periodic pattern components; and
a second filtering subset of the set of fine wavelength sensing elements that each span across the coarse and fine periodic pattern components;
wherein the first and second filtering subsets of the set of fine wavelength sensing elements are arranged such that each sensing element of the first filtering subset forms a complementary pair with a sensing element in the second filtering subset that is spaced apart from it along the measuring axis direction by an integer number K2 times 180 degrees of spatial phase difference in terms of the spatial wavelength $\lambda_C$.

13. The electronic absolute position encoder of claim 12, wherein K1 and K2 are even integers.

14. The electronic absolute position encoder of claim 12, wherein:

the set of coarse wavelength sensing elements is configured to provide the first set of detector signals corresponding to Q spatial phases spaced apart at 360/Q degrees of spatial phase difference in terms of the spatial wavelength $\lambda_C$; and the set of fine wavelength sensing elements is configured to provide the second set of detector signals corresponding to Q spatial phases spaced apart at 360/Q degrees of spatial phase difference in terms of the spatial wavelength $\lambda_F$.

15. The electronic absolute position encoder of claim 14, wherein Q=3.

16. The electronic absolute position encoder of claim 14, wherein Q=4.

17. The electronic absolute position encoder of claim 1, wherein:

the scale includes a first flat substrate that extends along the measuring axis direction; and the sensing elements each comprise an approximately planar loop winding formed on a second flat substrate arranged proximate to the first flat substrate with a gap therebetween, and each sensing element is relatively shorter along the measuring axis direction and relatively longer along a direction transverse to the measuring axis direction, and each sensing element spans across the coarse and fine periodic pattern components along the direction transverse to the measuring axis direction.

18. The electronic absolute position encoder of claim 1, wherein the signal modulating scale pattern formed when the coarse periodic pattern component and the fine periodic pattern component are superimposed in a single track along the measuring axis direction is a pattern that is symmetric with respect to a midline of the pattern that extends along the measuring axis direction.

19. The electronic absolute position encoder of claim 1, wherein the sensing elements of the detector comprise electromagnetic windings which are configured to provide detector signals that are responsive to a change in inductance sensed by the electromagnetic windings as a function of position along the signal modulating scale pattern.

20. The electronic absolute position encoder of claim 19, wherein the detector and the scale are configured as an eddy current transducer which operates by generating changing magnetic fields.

\* \* \* \* \*